United States Patent
Hundal

(10) Patent No.: US 7,634,231 B2
(45) Date of Patent: Dec. 15, 2009

(54) SYSTEM AND METHOD FOR ENHANCED INTEROPERABILITY BETWEEN A PLURALITY OF COMMUNICATION DEVICES

(75) Inventor: Sukhdeep S. Hundal, Delta (CA)

(73) Assignee: Vtech Telecommunications Limited, Tai Po, New Territory (HK)

( * ) Notice: Subject to any disclaimer, the term of this patent is extended or adjusted under 35 U.S.C. 154(b) by 439 days.

(21) Appl. No.: 10/786,128

(22) Filed: Feb. 26, 2004

(65) Prior Publication Data

US 2005/0191964 A1 Sep. 1, 2005

(51) Int. Cl.
*H04B 1/00* (2006.01)
*H04B 15/00* (2006.01)

(52) U.S. Cl. .................. 455/63.1; 455/41.2; 455/513; 370/321; 370/329; 375/132; 375/135; 375/136

(58) Field of Classification Search ............. 455/41.2, 455/63.1, 513; 370/321, 329; 375/132, 135, 375/136
See application file for complete search history.

(56) References Cited

U.S. PATENT DOCUMENTS

| | | | | |
|---|---|---|---|---|
| 5,809,059 | A | * | 9/1998 | Souissi et al. ............ 375/133 |
| 6,275,518 | B1 | * | 8/2001 | Takahashi et al. ......... 375/135 |
| 6,941,110 | B2 | * | 9/2005 | Kloper et al. ............ 455/67.11 |
| 2001/0022806 | A1 | * | 9/2001 | Adachi .................... 375/133 |
| 2002/0071402 | A1 | * | 6/2002 | Kockmann et al. .......... 370/330 |
| 2003/0153338 | A1 | * | 8/2003 | Herz et al. ................ 455/517 |

(Continued)

FOREIGN PATENT DOCUMENTS

WO  WO 02/25832 A3   3/2002

(Continued)

OTHER PUBLICATIONS

Kerry et al. ("Amendment to IEEE 802.11a avoids interference with other 5Ghz-Band devices" pp. 1-2; retrieve on Aug. 7, 2005; retrieved from the internet < URL: http://standards.leee.org/announcements/pr_80211hwlan.html>).*

(Continued)

*Primary Examiner*—Nay A. Maung
*Assistant Examiner*—Tuan H Nguyen
(74) *Attorney, Agent, or Firm*—Paul, Hastings, Janofsky & Walker LLP

(57) ABSTRACT

A system for allowing BT, WDCT, and 802.11 transceivers to operate in close proximity with a minimum of interference, is disclosed. In an exemplary embodiment, a method for avoiding interference between a first FHSS device and other RF devices using 802.11 or FHSS protocols is disclosed. The first FHSS device initially detects the presence of an interfering RF device ("interferer"), for example a device employing 802.11 protocol, and adjusts the frequency of channels used for operation of the first device accordingly to avoid overlap with the 802.11 band. In the presence of an additional interferer, for example, a second FHSS device emitting an interfering signal, the first FHSS device may segregate its operation channels to achieve maximum frequency separation from an 802.11 and second FHSS device. In addition, the first and third devices may also multiplex their transmit/receive timing to avoid interference in time domain. By avoiding interference in time domain, first and third device can occupy the same channels in the frequency band achieving further frequency separation from the 802.11 device.

23 Claims, 20 Drawing Sheets

U.S. PATENT DOCUMENTS

2004/0047324 A1* 3/2004 Diener ................ 370/338
2004/0132500 A1* 7/2004 Rogalski et al. ......... 455/569.1
2006/0176850 A1* 8/2006 Gan et al. .................. 370/329

FOREIGN PATENT DOCUMENTS

WO     WO 2003/090037 A3    10/2003

OTHER PUBLICATIONS

GB Search Report dated -Jul. 13, 2005.
Kerry et al.; "Amendment to IEEE 802.11a Avoids Interference With Other 5 GHz-Band Devices"; [online], p. 1-2; [retrieved on Aug. 7, 2005]; retrieved from the Internet < URL: http://standards.ieee.org/announcements/pr_80211hwlan.html>.

* cited by examiner

Known Art

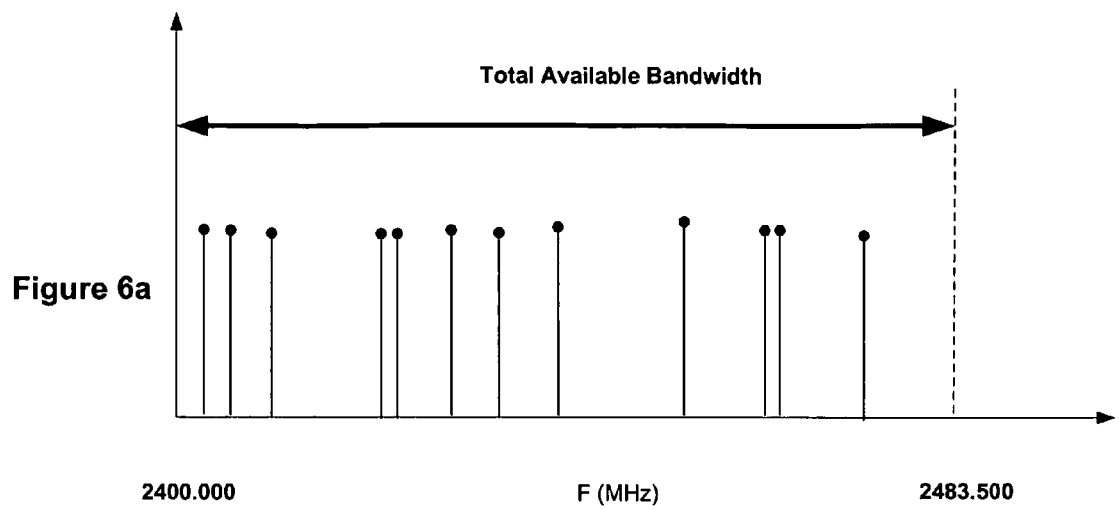
Figure 6a
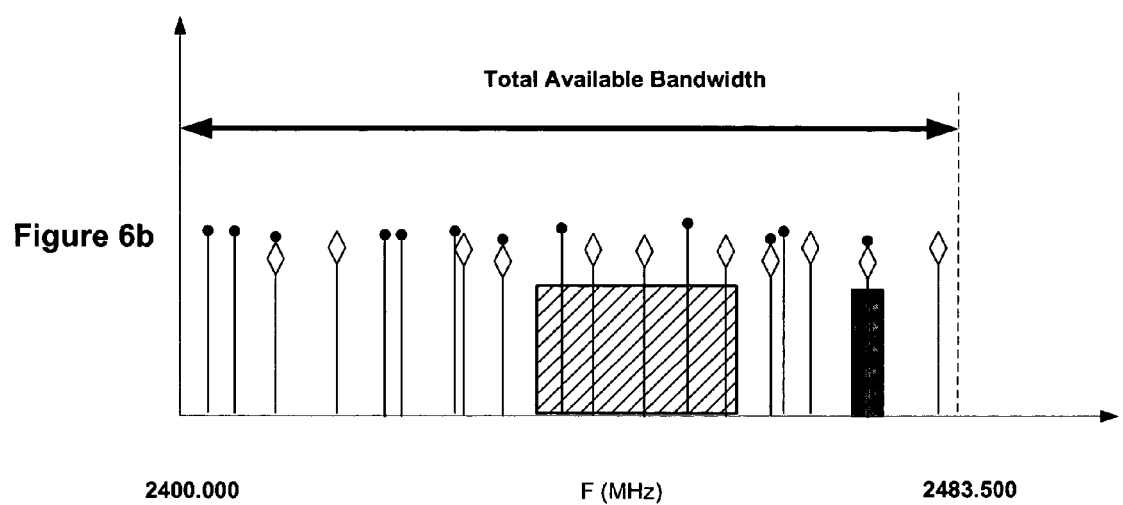
Figure 6b
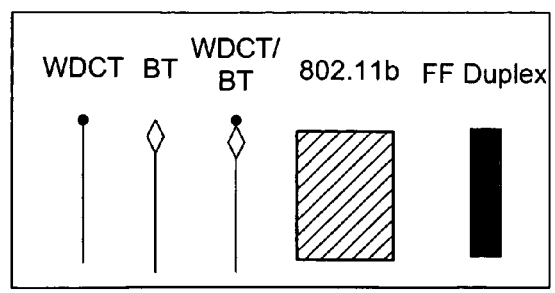

SYSTEM AND METHOD FOR ENHANCED INTEROPERABILITY BETWEEN A PLURALITY OF COMMUNICATION DEVICES

BACKGROUND

1. Field of the Invention

The present invention relates generally to wireless communication. More particularly, the present invention relates to improving interoperability of wireless devices employing different technology protocols or standards and working in close proximity to one another, or when embedded in a same enclosure.

2. Background of the Invention

The ISM (Industrial Scientific Medical) band includes 902-928 MHz, 2.4-2.483 GHz, and 5.725-5.875 GHz frequency ranges. In the United States, the ISM band is unlicensed, which means that any of the ISM band frequency ranges can be used in a variety of radio frequency (RF) applications as long as Federal (FCC) Communications Commission's part 15 rules are followed. One such RF application involves cordless telephones, which operate in each of the 900 MHz, 2.4 GHz, and 5.8 GHz ranges and typically employ a technology based on Worldwide Digital Cordless Telecommunications Standard (WDCT). Another application of the ISM band involves the Bluetooth (BT) wireless technology standard (also referred to hereinafter as "protocol"), which is deployed in the 2.4 GHz range frequencies and finds application in handheld devices, headsets, computers, and home appliances, among others. Both BT and WDCT employ frequency hopping spread spectrum (FHSS) technologies which provide for a signal to be carried over channels that can hop between different frequencies within an assigned frequency range.

Another prominent standard operating in the ISM band is the so called 802.11 standard employed frequently in wireless local area networks (LAN), computers, and related devices.

In a typical home, office, or industrial environment, a combination of devices employing two or all three of the above standards may be found. Such devices when operated in close proximity to one another, for instance, in the same room, will often interfere with one another during operation. For example, operation of a BT-based cell phone in close proximity to a WDCT 2.4 GHz cordless telephone would likely cause unacceptable interference for both Bluetooth and WDCT transceivers in the 2.4 GHz ISM band. In a situation in which a BT transceiver is located in a cordless handset, or an external Bluetooth module to support a cordless headset is in use with cordless handset that already has a conventional 2.4 GHz cordless telephone transceiver, significant interference can also be expected. Due to the significant interference, an acceptable communications session between a BT headset and the 2.4 GHz WDCT cordless handset may not be achievable.

The IEEE802.15.2 working group has published some proposed techniques for enhancing interoperability between devices employing 802.11 and BT standards. However, at the present time, there is no known technique for suppressing interference in an environment where devices employing the 802.11, WDCT, and BT standard are operating. This renders it extremely problematic for instance, to develop and deploy a communications product that can combine transceivers employing all three common standards. Additionally, as devices employing the above standards continue to proliferate, the use of multiple devices employing different standards will be increasingly used in close proximity to one another.

For example, if a cordless phone employing WDCT standard were operated in proximity to a wireless internet router employing the 802.11 standard, and also close to a separate BT phone, significant interference among all three devices could be anticipated. FIG. 1 illustrates an example of the frequencies that could be employed during operation of the above-named devices. During a communication session, the BT and WDCT (FHSS) devices each occupy a series of channels, in which one channel (about 1 MHz in bandwidth) at a time is occupied. During an FHSS session, a signal transmission continually cycles between channels, such that many different channels are occupied within the space of a short time frame, as illustrated in FIG. 1. An 802.11 channel occupies about 22 MHz of bandwidth and is fixed during a given communications session. As is evident, there is potentially significant overlap (interference) of BT and WDCT channels with the 802.11 channel (also referred to hereinafter as "band"). In addition, the BT and WDCT channels occupy the same channel frequencies in several places in the 2.4 GHz band.

In light of the above discussion, it will be appreciated that a need exists for developing a system to provide for interoperability of RF communication devices in close proximity, in which interference is minimized.

BRIEF SUMMARY OF THE INVENTION

The present invention provides a method for avoiding interference during operation of a first frequency hopping spread spectrum (FHSS) RF device, when the device is in close proximity to one or more other RF devices. In one step, an interference is detected by the FHSS device indicating the presence of another RF device. The other RF device may be, for example, another FHSS device, a device employing an 802.11 protocol, or a fixed frequency device. In an additional step, the frequency of operation of the first FHSS device is adjusted to avoid overlap with the other device or devices detected. In the case of the presence of a second FHSS device, both FHSS devices may, for example, adapt their operation frequencies to avoid mutual overlap of FHSS devices, and also to avoid overlap with an 802.11 device, if present.

An embodiment of the present invention provides a system that can provide minimization of interference among a plurality of RF devices operating in close proximity. The system comprises a first RF module which employs an FHSS protocol, and at least one other RF module. Also included in the system is a protocol stack and transcoder coupled to the first RF module and a system microcontroller in communication with the first module and the at least one other module. Instructions are sent from and received by the microcontroller that provide for the first module to adjust its operation frequencies to avoid interference with other RF devices.

In a further embodiment, an RF communications device includes protocol stack and transcoder linked to a RF transceiver and to a microcontroller, which facilitates the frequency separation of the channels employed by the RF device from the channels operated by other detected RF-interferers.

BRIEF DESCRIPTION OF THE DRAWINGS

FIGS. 6a and 6b illustrate possible interference during operation of a WDCT device in conjunction with other RF devices whose communications channels occupy the same frequency spectrum.

DETAILED DESCRIPTION OF THE INVENTION

Figure 1:
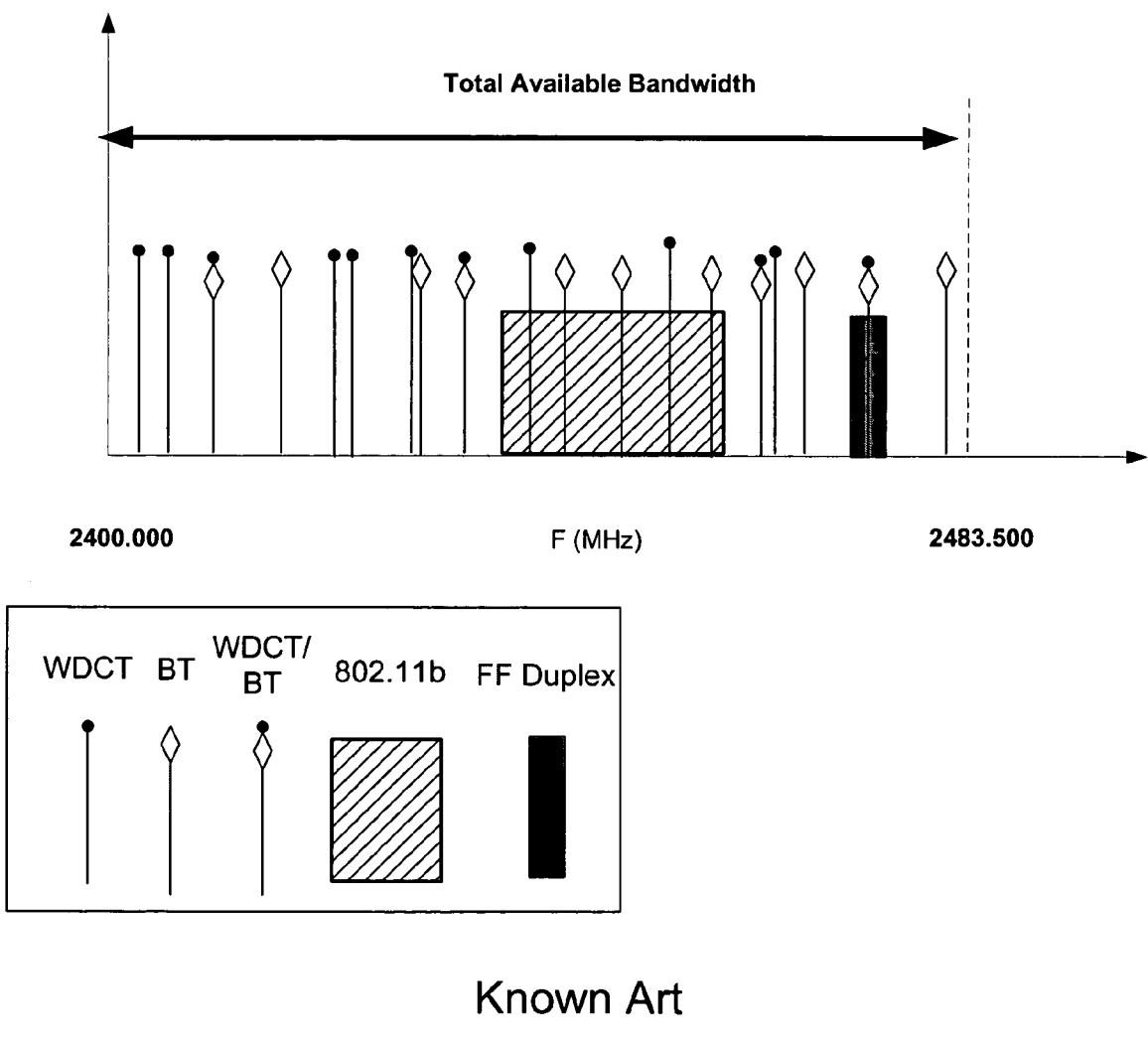
FIG. 1 illustrates interference between RF communications devices in prior art technology.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

Embodiments of the present invention relate to a system and method for automatically minimizing interference between RF communication devices. More specifically, the present invention relates to a system and method to minimize interference between a first FHSS device and at least one other RF device operating in close proximity to the FHSS device, where the devices in question operate in a radio frequency range, such as an ISM band.

Figure 2:
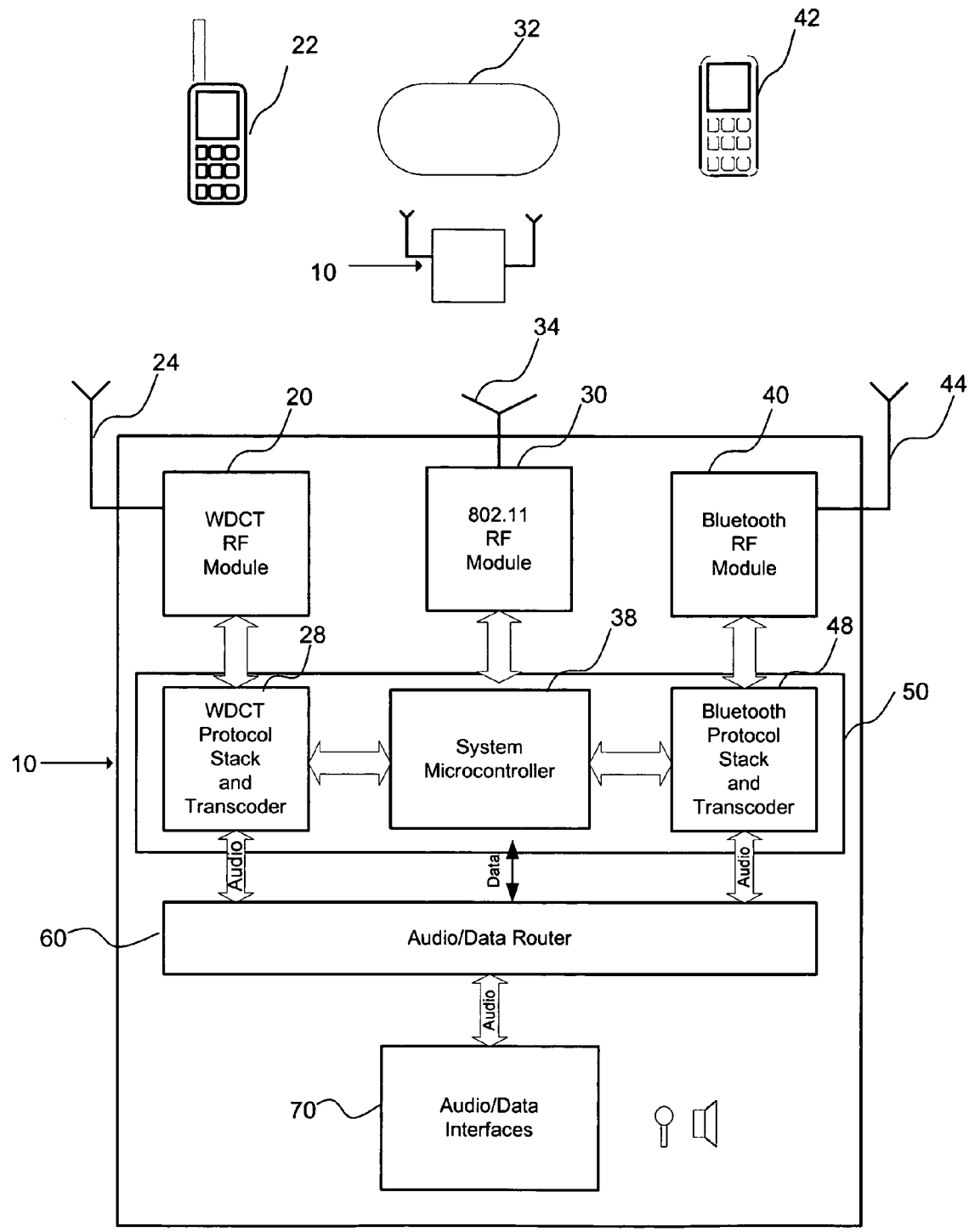
FIG. 2 illustrates a communications system for minimizing interference between RF communications devices according to an embodiment of the present invention.

FIG. 2 illustrates a communications system 10, comprising a plurality of RF devices in accordance with an embodiment of the present invention. For example, the system may represent a "base station" of a home or office communications network, that is in radio communication with a plurality of other devices. In an exemplary embodiment, system 10 includes WDCT transceiver 20 (hereinafter also referred to as "module"), which communicates via antenna 24 to other WDCT-enabled devices, such as portable phone handset 22. System 10 may further include BT transceiver 40, in communication via antenna 44 to cell phone 42, for example. Optionally, system 10 includes an 802.11 transceiver 30, which can communicate via antenna 34 with computer network 32. In a preferred embodiment, system 10 includes WDCT protocol stack and transcoder unit 28, linked to transceiver 20 and also to system microcontroller 38. Unit 28 operates to receive and translate data from both transceiver 20 and microcontoller 38. Preferably, system 10 further includes BT protocol stack and transcoder unit 48, linked to transceiver 40 and also to system microcontroller 48. Unit 48 operates to receive and translate data from both transceiver 40 and microcontoller 38. Preferably, 802.11 transceiver 30 is in communication also with microcontroller 38. Optionally, subsystem 50 may include a protocol stack and control circuitry for an 802.11 device as well. In an exemplary embodiment of the present invention, subsystem 50 comprises a single custom integrated circuit chip (ASIC) including transceivers and associated stacks and controls for a plurality of FHSS devices and an 802.11 device.

In an exemplary embodiment, units 28 and 48 and microcontroller 38 are linked to router 60, a common data/audio bus over which data and/or voice can be moved between elements 28, 38 and 48 and a corresponding 802.11 module (not shown). Signals such as audio and data may be output over bus 60 to interface 70. For example, interface 70 may be linked to a display for viewing data, a speaker for transmitting sound, and a receiver for receiving sound. Microcontroller 38 operates to help minimize interference between signals being received and transmitted at modules 20, 30 and 40, when two or more of the modules are in simultaneous operation. For example, when module 30 and 20 are in simultaneous operation, microcontroller 38 receives signals indicating that data is being received/transmitted through module 30 and a signal is being received/transmitted through module 20. Microcontroller 38 can subsequently send instructions to unit 28, so that the receipt and transmittal of signals to and from module 20 can be adjusted to minimize interference with the 802.11 band signal being received or transmitted at antenna 34 Alternatively, a similar procedure can be effected to reduce interference between module 30 and 40 during simultaneous operation. In another embodiment of the present invention, in the case where all three modules receive and/or broadcast information simultaneously, microcontroller 38 regulates the frequency of operation for modules 40 and 30, such that the three transceivers interoperate with minimal interference.

Figure 3:
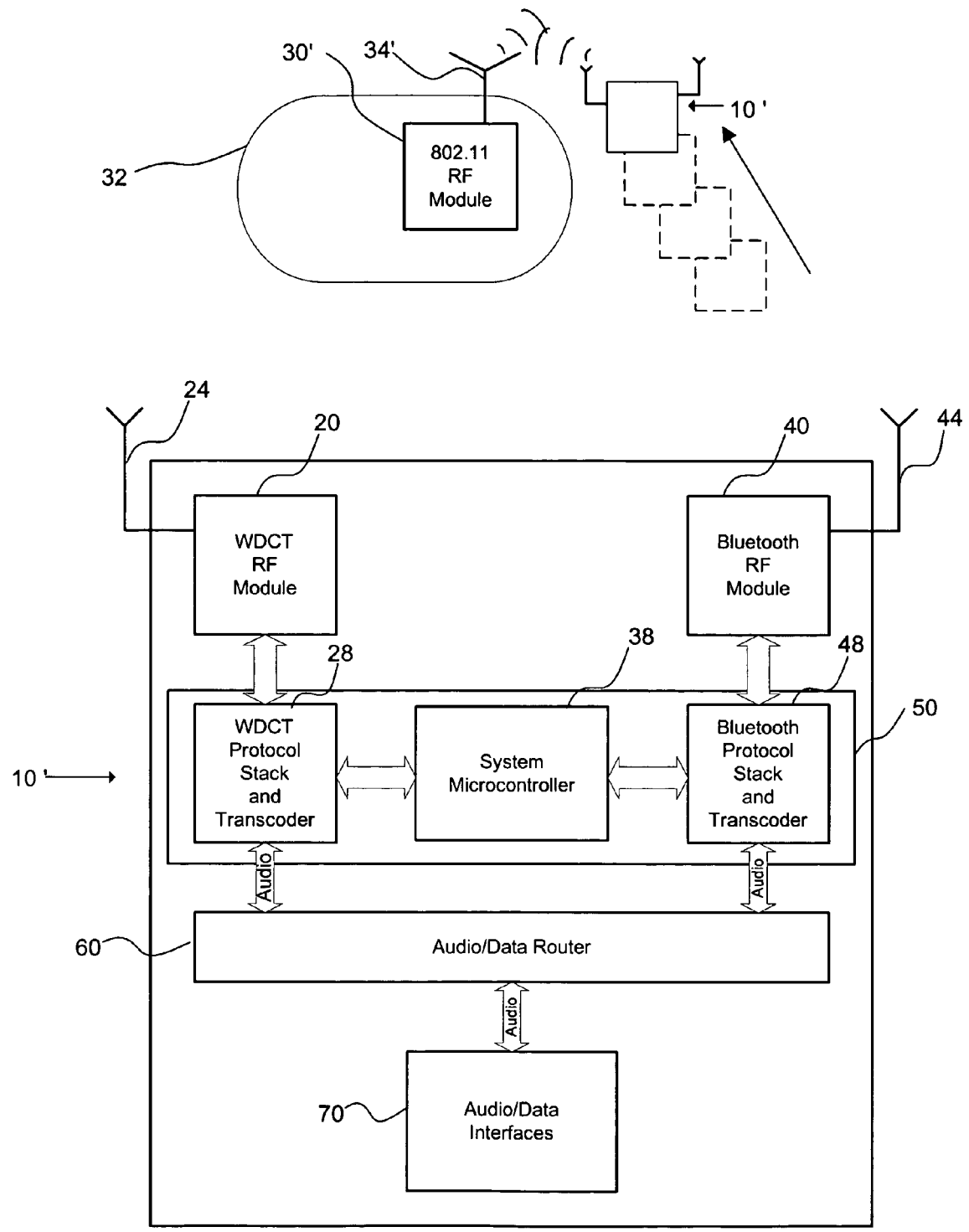
FIG. 3 illustrates a communications system for minimizing interference between RF communications devices according to another embodiment of the present invention.

Although FIG. 2 depicts embodiments of the present invention in which three RF devices are collocated in a single physical housing, the present invention also includes embodiments in which the system contains a single RF device or two RF devices collocated within a single housing. For example, FIG. 3 illustrates a system according to an embodiment of the present invention in which system 10' contains module 40 and WDCT module 20 collocated in a portable housing, whose proximity to a stationery data network 32 may vary. As illustrated in FIG. 3, network 32 includes 802.11 module 30'. In another embodiment of the present invention, both FHSS modules in system 10' receive and/or broadcast information simultaneously, wherein microcontroller 38 regulates the frequency of operation for modules 40 and 30, such that the transceivers 40 and 20 interoperate with minimal interference. When system 10' is bought into close proximity to network 32, during a period in which signals are being received and/or transmitted to or from module 30, system 10' detects the presence of an 802.11 device, and instructions are sent to transceivers 20 and 40 to adjust their frequency of operation to avoid overlap with the 802.11 band and each other.

Other embodiments of the present invention include systems in which an 802.11 device and a BT device, or alternatively, an 802.11 device and a WDCT device are collocated in a single housing. For example, in the latter embodiment, depicted in FIG. 4, during operation when both the WDCT and 802.112b transceivers located within the system are receiving and or sending signals simultaneously (both transceivers are "on"), the WDCT module detects the presence of the 802.11 frequency band. Subsequently, using built-in intelligence incorporated in unit 28 and transceiver 20, in conjunction with microcontroller 38, the WDCT channel frequencies are adjusted to avoid overlap with the 802.11 band. While both WDCT and 802.11 transceivers are on, an external BT device, for example, a cell phone 42, which is also actively receiving or sending signals, may be brought into close proximity with the system. The WDCT module then detects the cell phone presence and the system makes further adjustments to ensure that frequency overlap between the WDCT, 802.11, and cell phone transceivers, are reduced. Even if the cell phone 42 contains prior art BT module 41, without the built-in intelligence included in transceiver 20, it may, for example, have adaptive frequency hopping capability built into prior art FHSS devices. The latter capability enables the cell phone to adjust its channel frequencies, eventually leading to a minimum of interference between the BT, WDCT, and 802.11 and transceivers.

Figure 4:
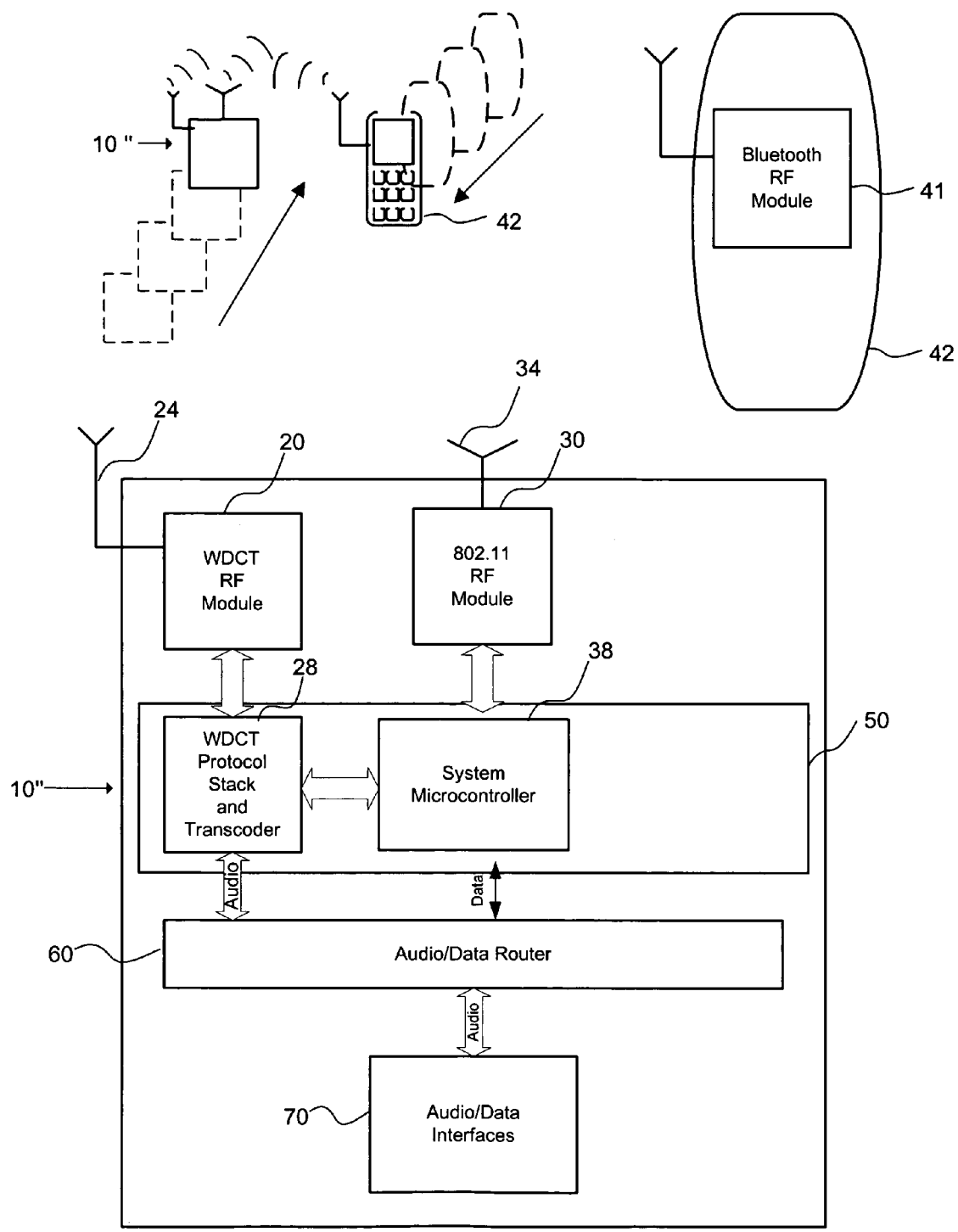
FIG. 4 illustrates a communications system for minimizing interference between RF communications devices according to a further embodiment of the present invention.
Figure 5:
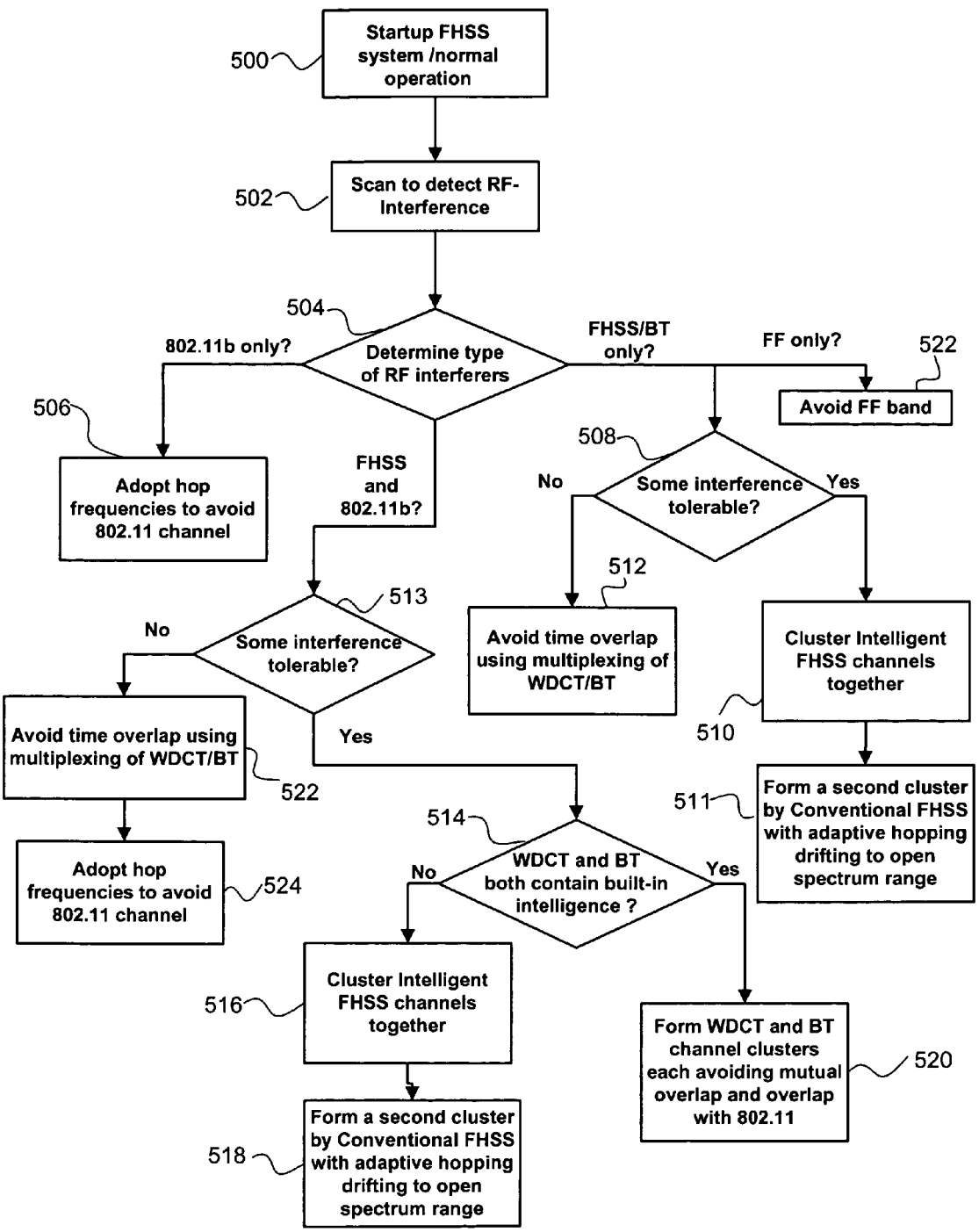
FIG. 5 illustrates a method system for minimizing interference between a plurality of RF communications devices according to still another embodiment of the present invention.

FIG. 5 illustrates details of a method to minimize interference between any combination of BT, WDCT, and 802.11 devices operating in close proximity to one another. In step 500, a communications system including at least one FHSS device begins operation. During the startup of operation, a communications session employing the FHSS transceiver is established, using the normal protocol associated with the FHSS device. In an exemplary embodiment, the system is configured as shown in FIG. 4, where both a WDCT transceiver and 802.11 transceiver are enclosed in a common housing. For example, system 10" may embody a base station for a cordless phone using a WDCT protocol, as well as for communication with a wireless data network using an 802.11 protocol. In the above example, in step 500, the WDCT transceiver may operate to facilitate a phone call to a user employing a handset communicating with base station 10". FIG. 6a illustrates an example of ISM channels occupied during a communications session with a WDCT device. In current, WDCT technology, approximately 17 channels may be employed spanning a range between 2.400 and 2.4835 GHz, although a smaller number are displayed in FIG. 6a for the sake of clarity of illustration. At any given time signal transmission takes place using one of the 17 channels. The transmission is regularly cycled between all of the channels. For example, that each channel may be occupied for about 10 milliseconds, such that the cycle time is about 170 milliseconds.

Figure 7:
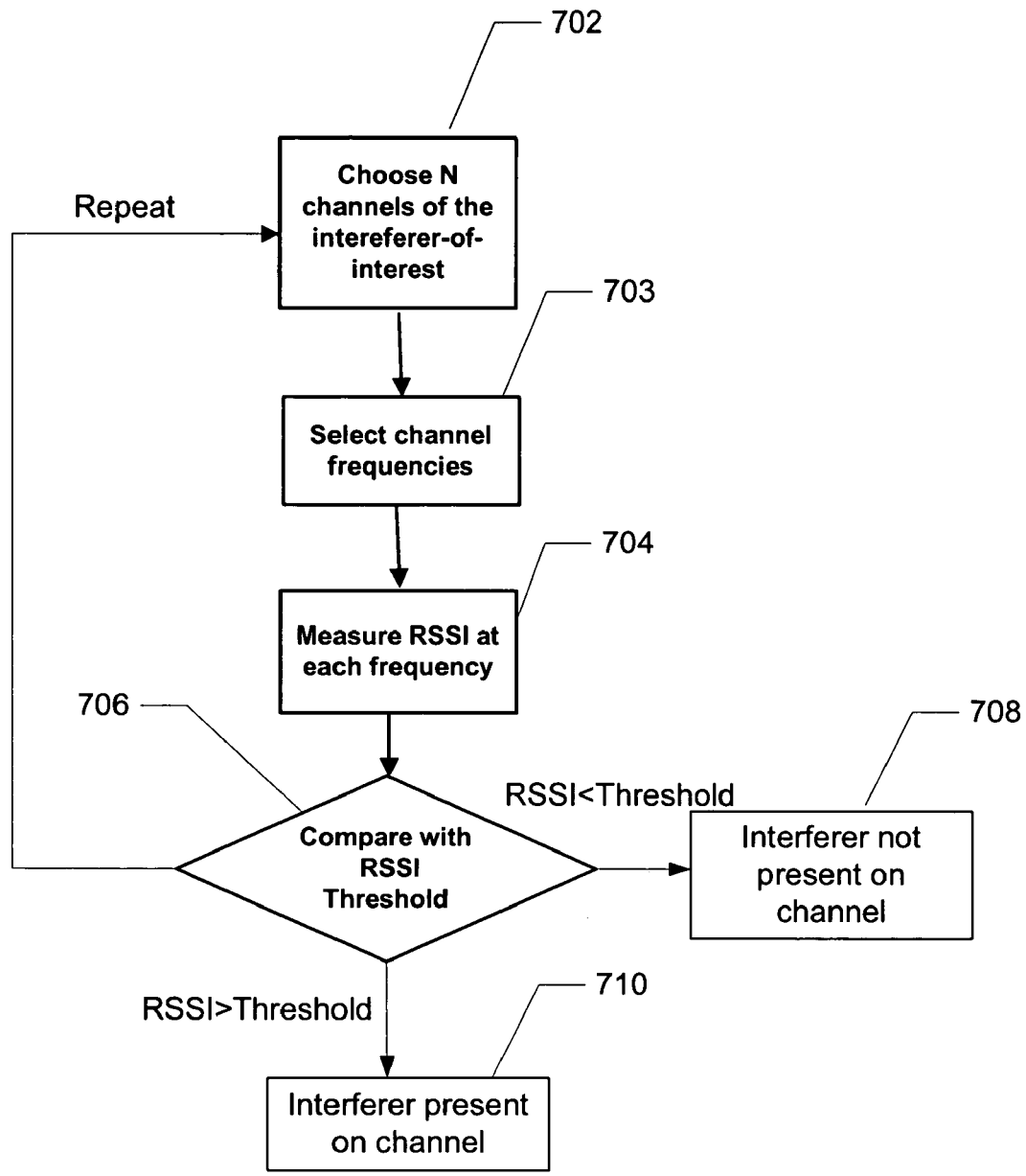
FIG. 7 illustrates a method for the detection of RF interferers by a WDCT transceiver according to an embodiment of the present invention.

When data is sent or received by another RF-transceiver(s) located near WDCT transceiver 20, the transmission may initially interfere with the WDCT channels employed by transceiver 20, as illustrated in FIG. 6b. The potential interferers may include BT, 802.11, and fixed frequency (FF) duplex transceivers. In an embodiment of the present invention, at step 502, transceiver 20 scans the ISM band to detect an interfering signal. FIG. 7 is a flow chart illustrating a method for identifying an interferer in a communication channel, which is disclosed in more detail in U.S. patent application Ser. No. 10/338,011. In step 702, "N" channels in which the interferer is likely to operate are chosen. for example, three channels that might lie within a ~20 MHz range of each other corresponding to an 802.11 range illustrated in FIG. 6b can be chosen in step 702. Any N channels can be selected. Selection can be by the user or predetermined.

In step 703, a frequency is selected in each channel at which to determine a received signal strength indication (RSSI). The frequency can be selected using a priori knowledge of the interferer such as channel structure, channel frequency and channel bandwidth.

In step 704, the RSSI is measured at each of the selected frequencies. In one embodiment of the present invention, RSSI is measured by tuning the receiver to each particular channel (or frequency) for a short period of time. Any interferers present within the tuning bandwidth are downconverted to intermediate frequency by the receiver. A received signal strength indication (RSSI) is measured at the downconverted intermediate frequency.

Figure 8:
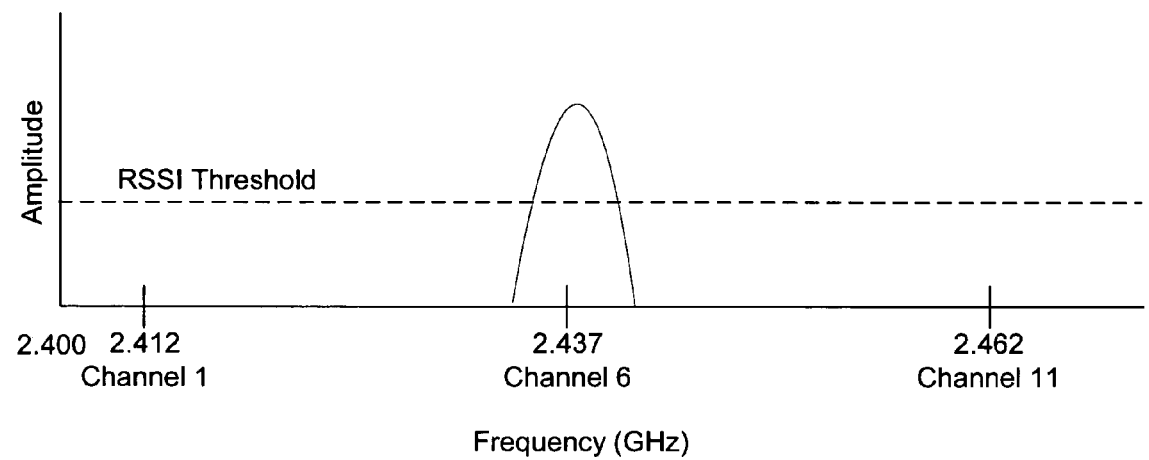
FIG. 8 depicts details of a method for detecting the presence of an RF interferer according to another embodiment of the present invention.

The measured RSSI for each frequency is compared to a threshold. The threshold can be predetermined or dynamically adjustable. A dynamically adjustable threshold allows the present invention to be adjusted for a particular environment. If the measured RSSI for a particular channel exceeds the threshold (determined in step 706), the interferer is deemed present in the channel as shown in step 710. As illustrated in FIG. 8, for example, the signal present in one of three channels selected to monitor (channel 1) exceeds an exemplary RSSI threshold.

If the measured RSSI for a particular channel is less than a threshold in the selected bandwidth (determined in step 706), the interferer is deemed not present in the channel as shown in step 708.

In the case of 802.11, for example, RSSI can be measured at a selected frequency in channel 6 of the 802.11 band. This process is then preferably repeated at other frequencies and if the RSSI measured at the selected channel frequencies exceeds a threshold, the presence of an 802.11 can be established.

Steps 702 to 710 may be repeated to determine the presence or absence of other interferers, such as additional FHSS devices or an FF device. Referring again to FIG. 5, in step 504, system 10" completes a determination of interferers in close proximity, based on steps illustrated in FIG. 7.

Figure 9:
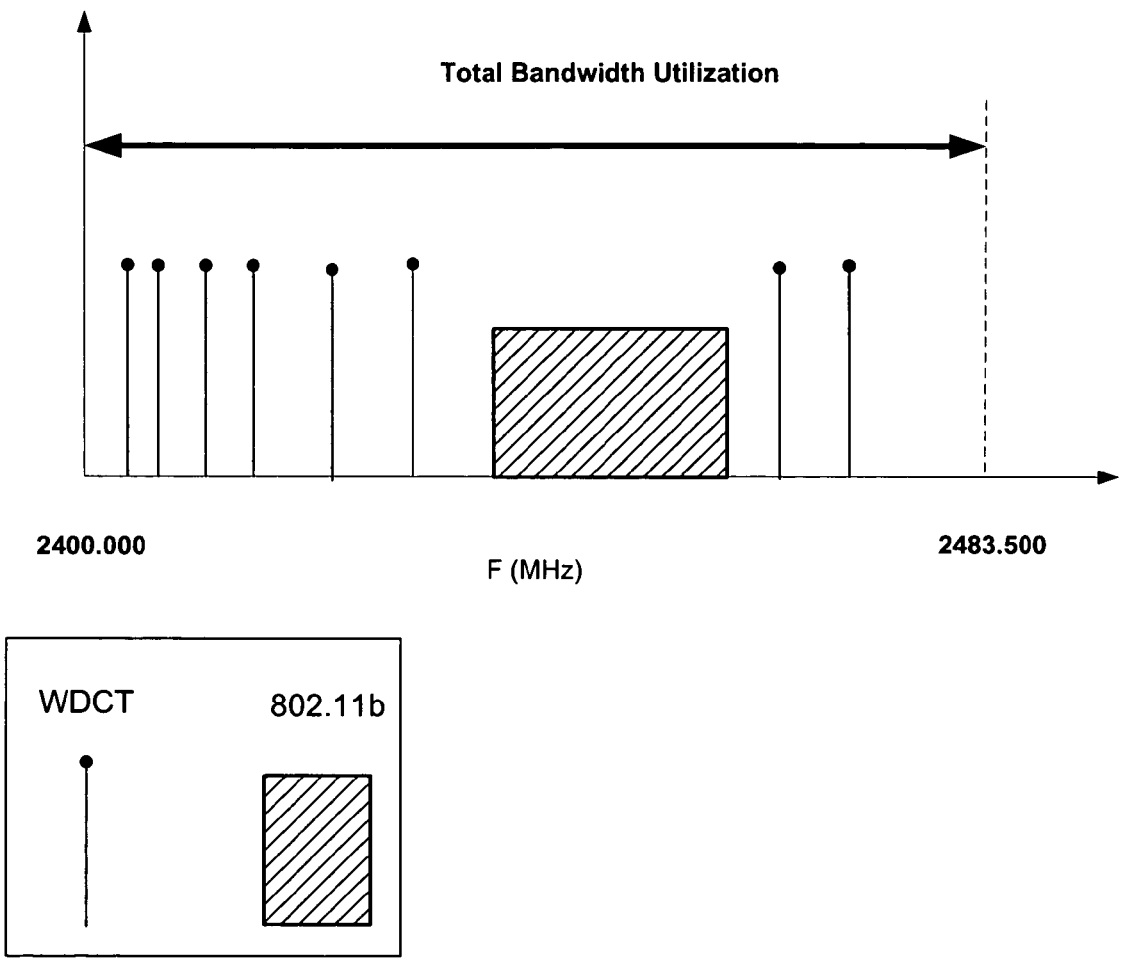
FIG. 9 illustrates the avoidance of overlap of WDCT channels in an active WDCT transceiver with an 802.11 band, according to still another embodiment of the present invention.

If system 10" detects the presence of only an 802.11b interferer, in step 506, the WDCT hopping frequencies are adjusted to avoid overlap with the 802.11 signal. In an exemplary embodiment, microcontroller 38 instructs WDCT transceiver 20 to employ channels that lie within ranges outside of the 802.11 channel, as illustrated in FIG. 9. Subsequently, signal transmission and reception of the WDCT transceiver may take place in a series of channels that occupy a frequency range below the 802.11 range, and also in a frequency range above the 802.11 range.

Figure 10:
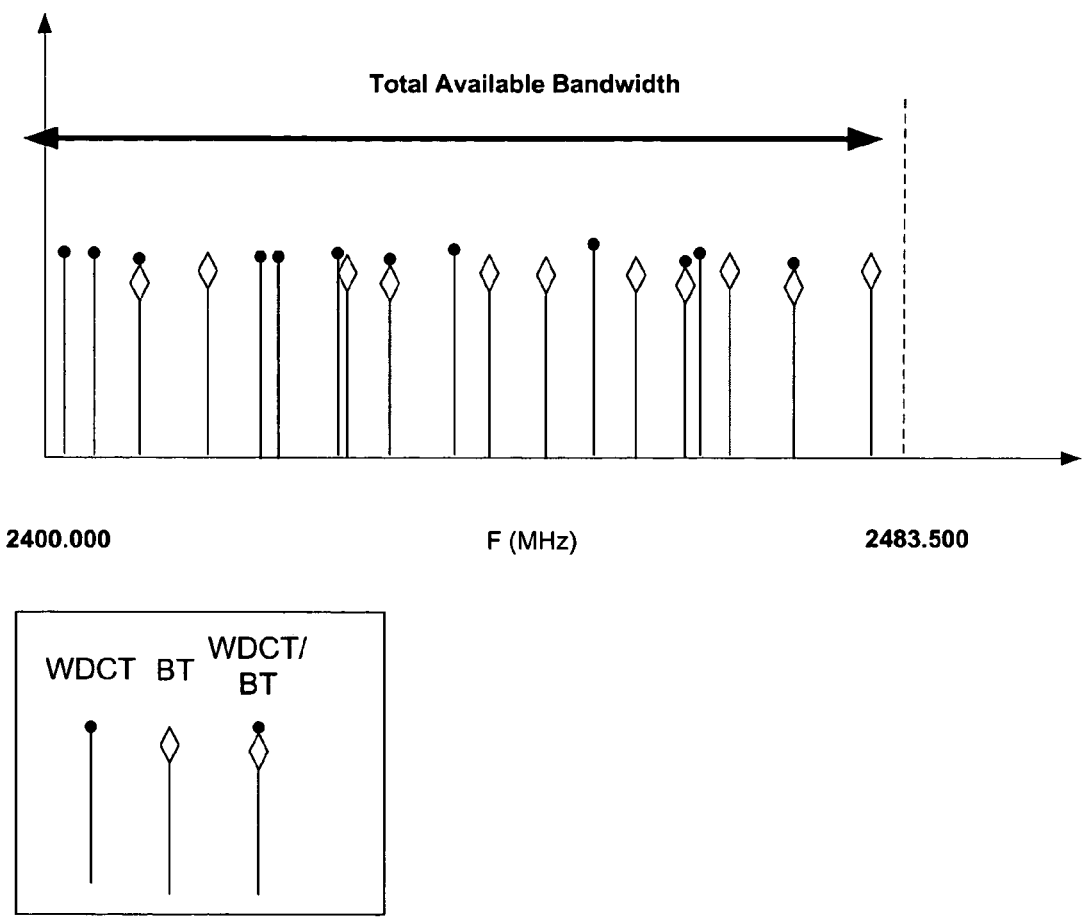
FIG. 10 illustrates the overlap of WDCT channels with BT channels when a BT device operates in close proximity to the WDCT device.

If, at step 504, system 10" detects the presence of only an FHSS interferer, for instance, a BT device, the present invention provides more than one method for reducing the interference between transceiver 20 and the FHSS interferer. For example, as illustrated in FIG. 4, a BT cell phone may come within a close distance of system 10". An RSSI signal corresponding to the BT device may then be detected to exceed a threshold, as illustrated in FIG. 8. However, unlike the case of an 802.11 interferer, the BT signal being sent to or from module 41 cycles through a series of ~1 MHz channels similar to WDCT transceiver 20. For example, in current BT devices typically 20 channels may be employed. As illustrated in FIG. 10, several channels may be occupied by both BT and WDCT transceivers. Additionally, there may be several regions of the spectrum where WDCT and BT channels are located near each other. Depending on the amount of WDCT-BT channel overlap that is initially present, and the amount by which the BT signal exceeds a predetermined RSSI threshold, a Bit Error or Frame Error rate, among other criteria, system 10" can determine whether a certain level of intermittent interference is tolerable, as illustrated in step 508.

Figure 11A:
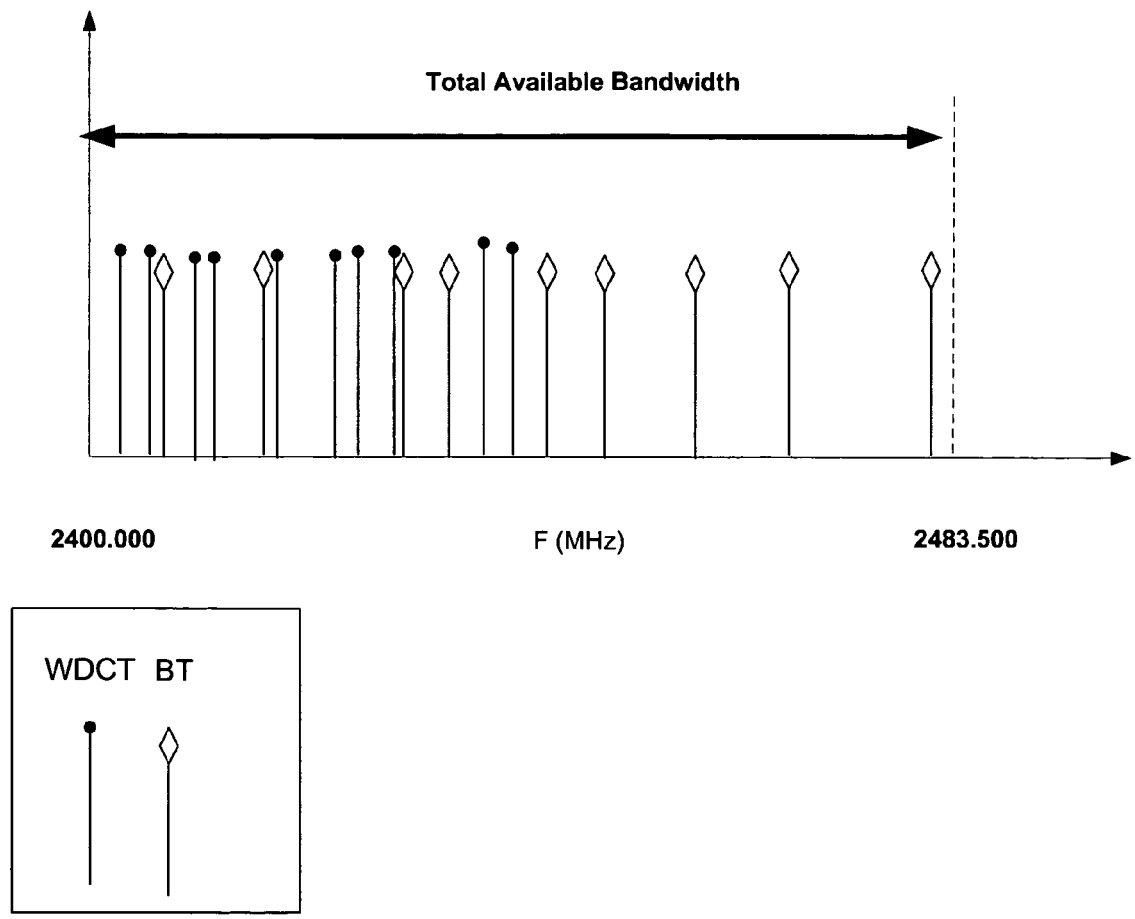
FIGS. 11a and 11b illustrate the avoidance of overlap of WDCT channels in an active WDCT transceiver with channels occupied by a BT device, according to yet another embodiment of the present invention.
Figure 11B:
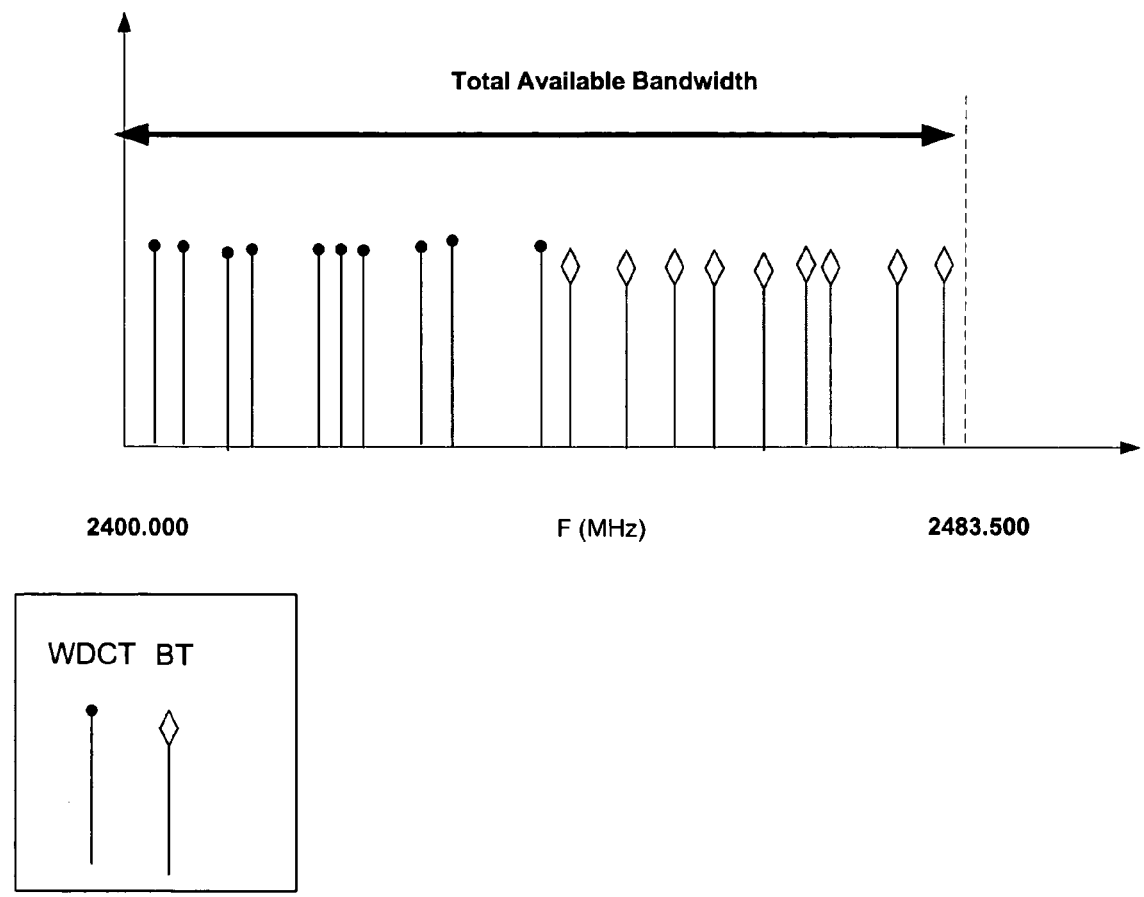

If some interference is tolerable, and the BT and WDCT devices can operate in the same time domain, then in step 510, transceiver 20 employs adaptive frequency hopping to avoid overlap with BT transceiver 41. If BT module 41 operates according to prior art, it will also have built-in capability for adaptive frequency hopping to avoid interference with transceiver 20. Transceiver 20, employing intelligent frequency adapting behavior, effects a clustering of WDCT channels in a first frequency range of the ISM spectrum illustrated in FIG. 11*a*. As indicated in step 511, and further illustrated in FIG. 11*b*, the operation of transceiver 41 eventually adjusts its hopping frequencies avoid substantial overlap between WDCT and BT signals. By continuing to encounter WDCT interference in the low frequency range, the BT channels assigned migrate to a higher frequency range, forming a cluster where no interference is encountered, so that substantial overlap between the BT and WDCT channels is avoided.

In step 508, if a WDCT transceiver determines that interference from another FHSS device must be minimized, in step 512 the present invention provides a method to eliminate overlap of the potential FHSS interferer with the WDCT transceiver, by operating the WDCT and other FHSS device in different time domains, that is, the WDCT and other FHSS device do not receive and transmit signals simultaneously. For example, as illustrated in FIG. 4, BT transceiver 41 might be in such close proximity to WDCT transceiver 20 that the RSSI is too excessive to tolerate overlap of signals. Alternatively, in systems such as system 10 depicted in FIG. 2, where a WDCT transceiver and BT transceiver are collocated in a single housing, perhaps only inches apart, the need to minimize interference when both devices are "on" may also be paramount.

In step 512, the transmission/receive (Tx/Rx) timing of the WDCT transceiver is adjusted to avoid mutual interference with a BT transceiver. Although data rates and the frame formats are different for BT and WDCT air interfaces, there is one commonality between the WDCT and BT frame formats. The total time for one slot in WDCT frame is 1.25 ms (milliseconds) (guard slot plus active slot), and the total time for one transmit plus receive slot in BT is also 1.25 ms. An embodiment of the present invention makes use of this common slot timing of WDCT and BT air interfaces by multiplexing WDCT and BT air interface slots by adjusting timing of WDCT transmit/receive (Tx/Rx) based upon a BT system clock.

Figure 12:
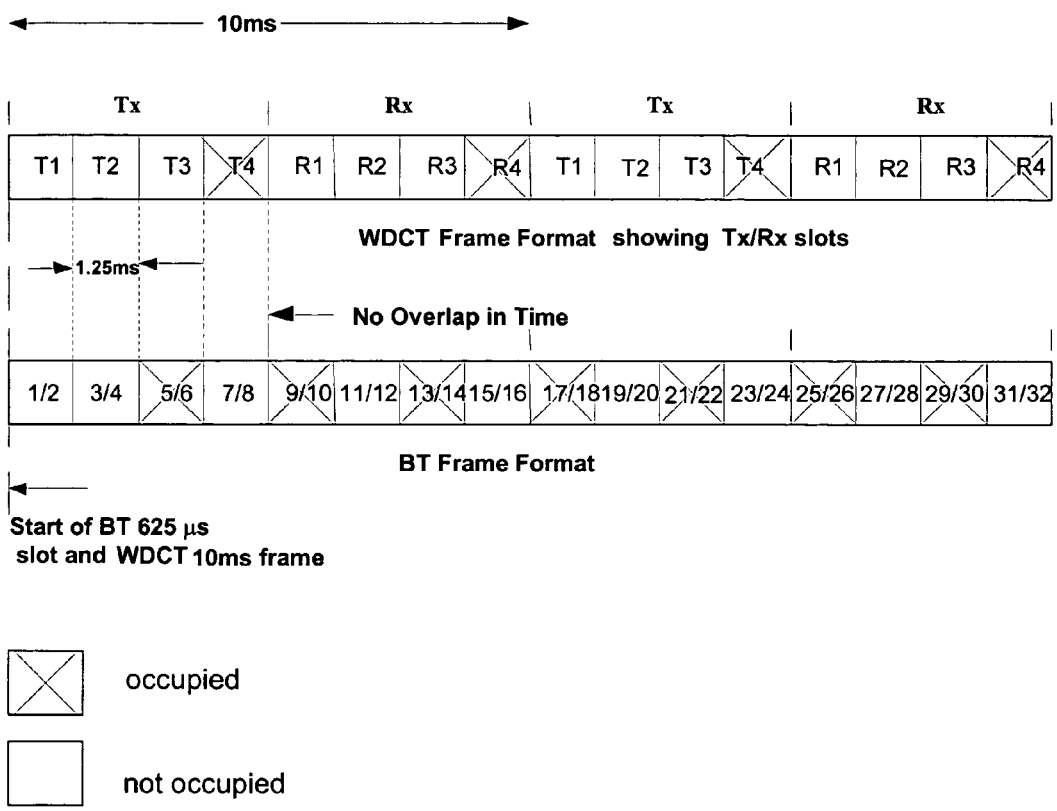
FIG. 12 illustrates time division allotment to avoid overlap between an active BT and WDCT device according to a another exemplary embodiment of the present invention.

FIG. 12 is a schematic diagram of time synchronization between the WDCT and BT time slots, showing that by multiplexing the slot use in time domain and time synchronization between the WDCT and BT transceivers, mutual interference can be avoided. In an exemplary embodiment of the present invention, a WDCT device measures an RSSI received from a nearby BT device and converts the RSSI into a signal timing to estimate the time at which the BT device begins transmitting during an Rx/Tx cycle. The Rx/Tx of the WDCT transceiver is subsequently adjusted as depicted in FIG. 12. Thus, even if WDCT and BT channels overlap in frequency, the time multiplexing ensures no interference of signals. A number of further embodiments that can be implemented to avoid mutual interference between a WDCT and BT transceiver similar to that in FIG. 12 are disclosed in U.S. patent application Ser. No. 10/429,763 and incorporated by reference herein.

If, at step 504, a WDCT device detects the presence of both an 802.11 and an FHSS interferer, the system adjusts the operation of the WDCT transceiver to avoid overlap with both interferers. In an exemplary embodiment of the present invention, WDCT module 20 detects the presence of interference from 802.11 transceiver 30, and from BT transceiver 41, as depicted in FIG. 4.

In a preferred embodiment of the present invention, transceiver 20 includes built-in intelligence that recognizes the presence of both BT and 802.11 interferers. In step 513, if, for instance, the BT and WDCT devices are not collocated within a common housing, and some interference is tolerable, the present invention provides features which allow all three RF devices to interoperate, depending on the level of intelligence built into the interfering BT device, as illustrated in step 514. If the intelligent WDCT device determines that the BT interfering device contains no comparable built-in intelligence, then adjustment for interferers proceeds as in step 516.

Figure 13:
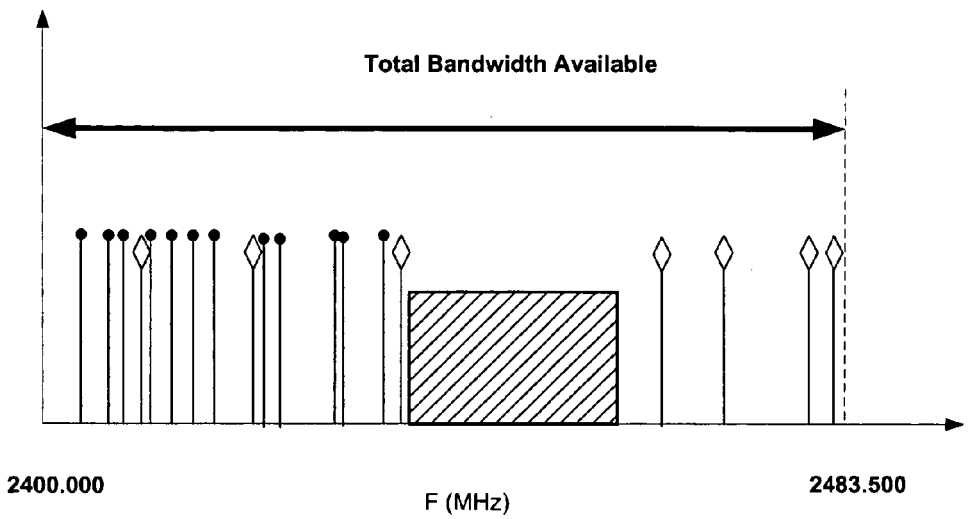
FIG. 13 illustrates the results of an initial step to avoid interference among BT, WDCT, and 802.11 devices, according to a still further exemplary embodiment of the present invention.
Figure 13:
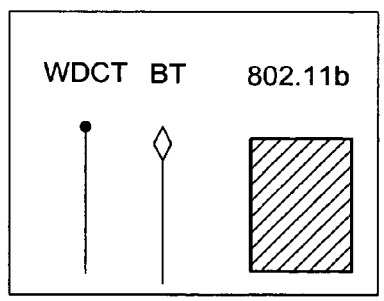

In step 516, the WDCT operating channels are adjusted so that all the channels cluster together in a first region of the available ISM band, as illustrated in FIG. 13. In the example shown, the 802.11 channel occupies a central portion of the ISM band, and the WDCT channels therefore cluster to one side of the WDCT band. Inasmuch as BT transceiver 41 does not contain the built-in intelligence included in transceiver 20, the BT channels initially span a range of frequencies throughout the ISM spectrum. However, transceivers 41 does contain adaptive frequency hopping capability common to prior art FHSS devices, which helps minimize direct overlap with the 802.11 band.

Figure 14A:
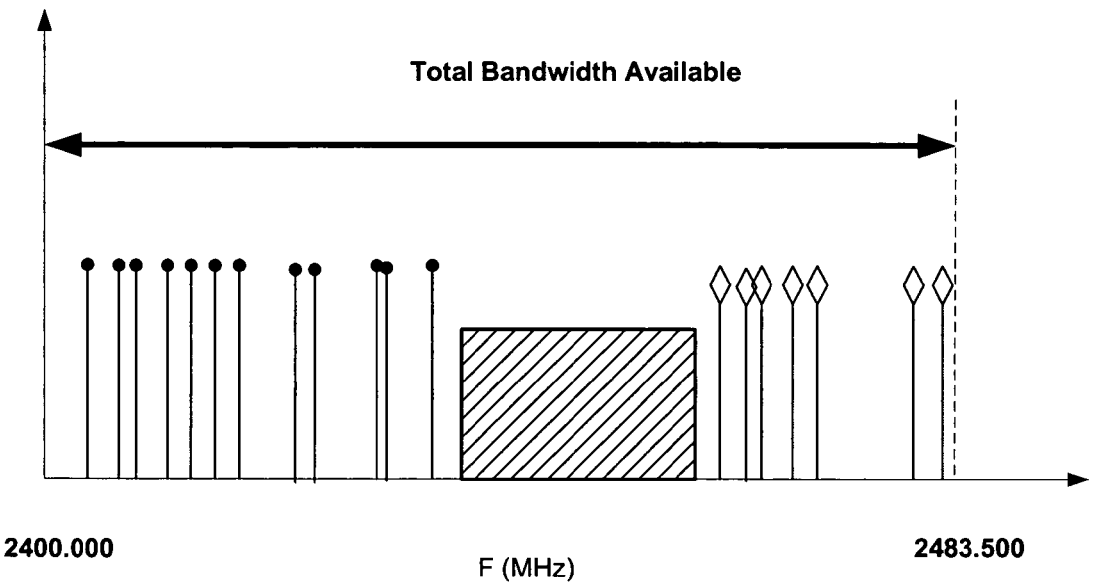
FIGS. 14a and 14b illustrate the results of a second clustering step employed to avoid interference among BT, WDCT, and 802.11 devices, according to further exemplary embodiments of the present invention.
Figure 14A:
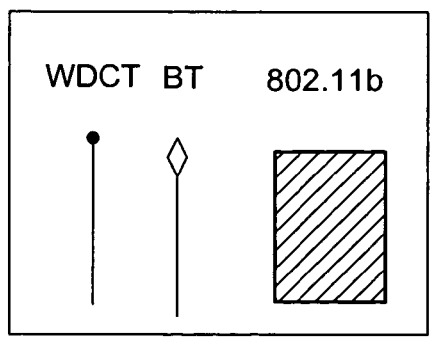

In step 518, the adaptive frequency hopping capability of BT transceiver 41 promotes the segregation of BT channels into open regions of the ISM band not occupied by the WDCT device or the 802.11 device. Thus, for example, the BT channels cluster on the opposite side of the 802.11 band from that occupied by the WDCT channels, as depicted in FIG. 14*a*. Because the built-in intelligence of WDCT transceiver 20 allots the WDCT channels only to the low frequency side of the 802.11 band, the BT channels initially assigned on the low frequency side of the 802.11 band continue to experience potential interference with WDCT channels. By continuing to encounter WDCT interference in the low frequency range below the 802.11 band, the BT channels assigned eventually migrate to the high frequency side of the 802.11 band, forming a cluster where no interference is encountered and the devices continue their operation without substantial overlap between the BT, WDCT and 802.11 frequencies employed.

Figure 14B:
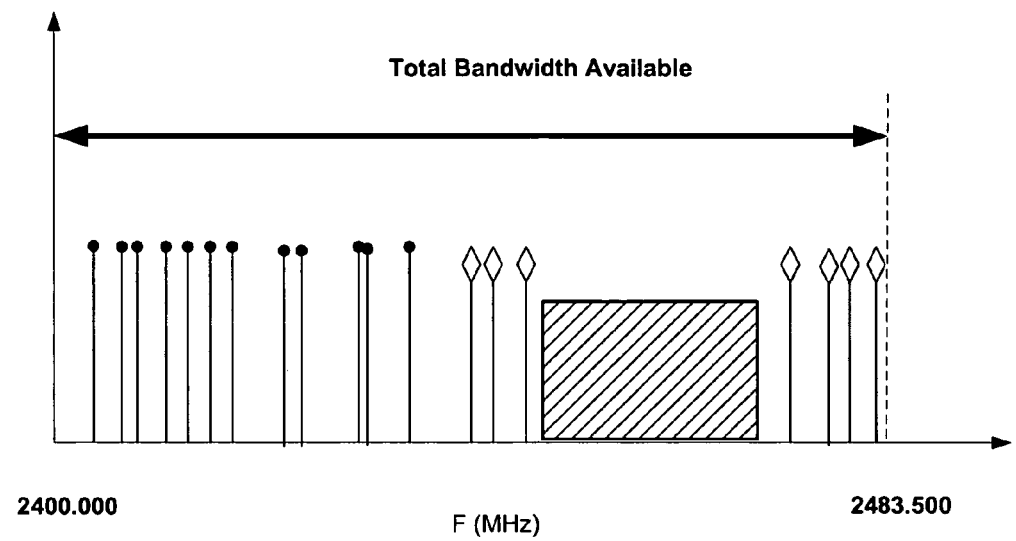
Figure 14B:
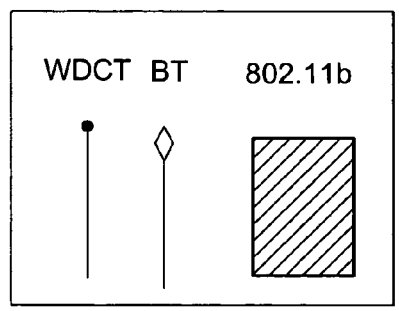

Alternatively, if the 802.11 band occupies a position more close to one end of the ISM frequency band, the present invention provides embodiments in which the FHSS devices may segregate in multiple clusters, as depicted in FIG. 14b. In the example depicted, a first cluster of BT channels forms to the low frequency side of the 802.11 band and a second cluster forms to a high frequency side to the 802.11 band.

In another preferred embodiment of the present invention, a communications system includes a WDCT transceiver and a BT transceiver, both with built-in intelligence to recognize the presence of a plurality of RF interferers and adjust their operation accordingly. Referring again to FIG. 2, in an exemplary embodiment transceivers 20 and 40 are collocated in system 10 and include built-in intelligence that recognizes the presence of both FHSS and 802.11 interferers. In step 504, both transceivers 20 and 40 detect the presence of interference from 802.11b transceiver 30, as well as from each other. In step 520, WDCT transceiver 20 adjusts its channel allocation so that all channels cluster on the low frequency side of the 802.11 band while transceiver 40 causes all the BT channels to cluster in the high frequency side of the 802.11 band, resulting in the channel distribution as depicted in FIG. 14a. Because of the built-in intelligence of both BT and WDCT transceivers, the clustering of channels depicted in FIG. 14a occurs much faster than in the case where no intelligence is built into the BT device.

Figure 15:
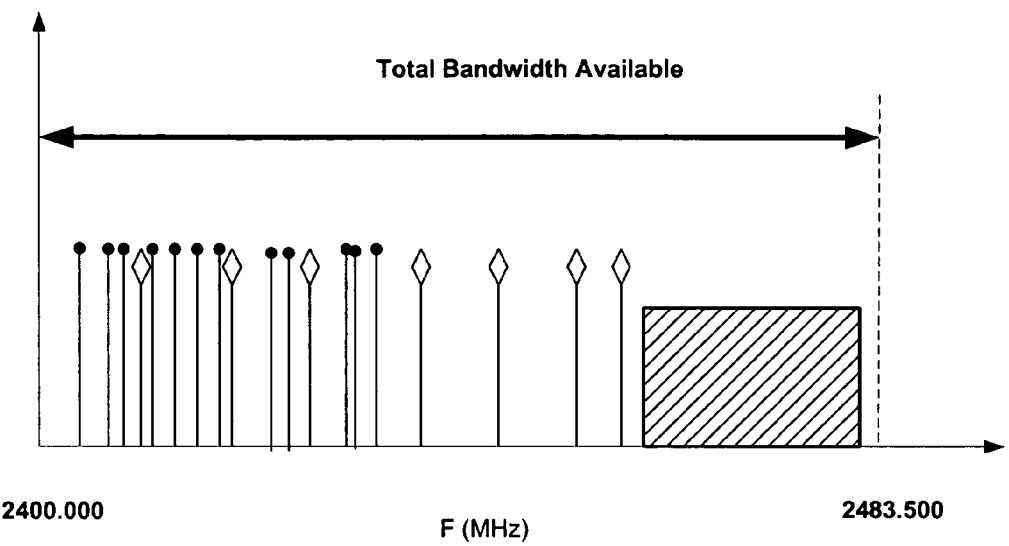
FIG. 15 illustrates the results of an initial step to avoid interference among BT, WDCT, and 802.11 devices, according to an additional further exemplary embodiment of the present invention.
Figure 15:
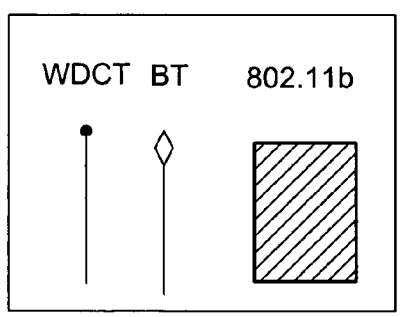
Figure 16:
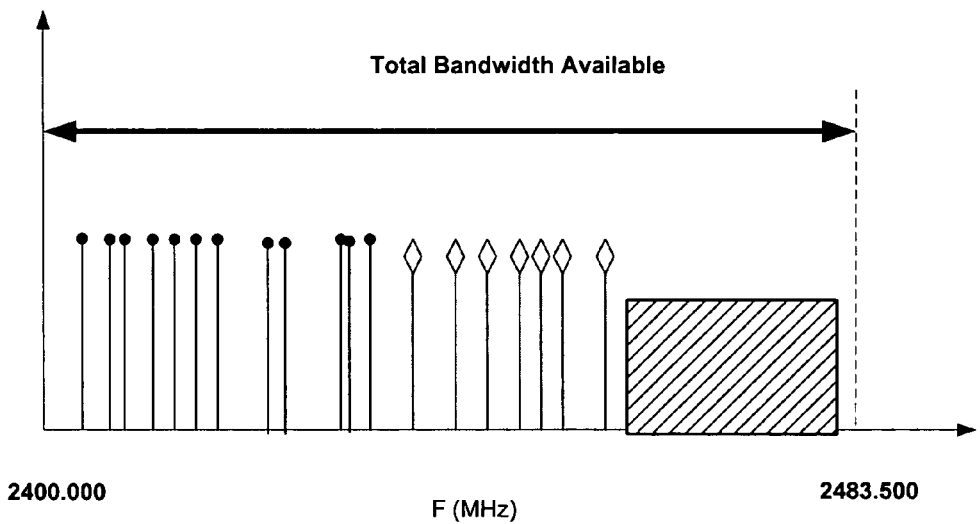
FIG. 16 illustrates the results of a second step employed after that depicted in FIG. 15, to avoid interference among BT, WDCT, and 802.11 devices, according to an additional further exemplary embodiment of the present invention.
Figure 16:
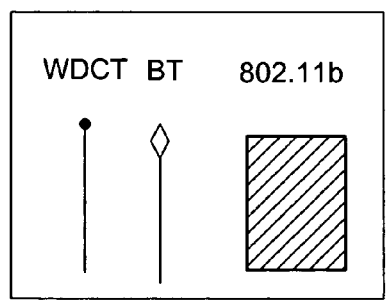

Although FIGS. 13 and 14a depict embodiments in which an 802.11b device occupies a central portion of an available band, other embodiments of the present invention include examples where an 802.11b device occupies an extreme end portion of an available spectrum. In the latter embodiments, steps 516 and 518 (or 520) act to promote mutual clustering of FHSS devices, as depicted in FIGS. 15 and 16, respectively.

Figure 17:
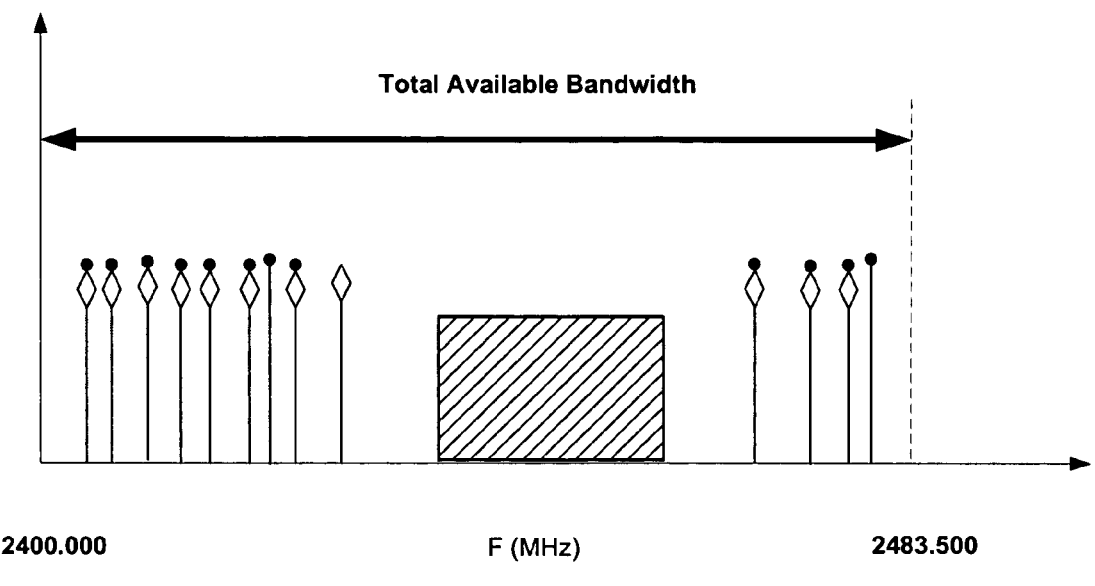
FIG. 17 illustrates the operation of a WDCT and BT device in different time domains, working in conjunction with an 802.11 device, according to another embodiment of the present invention.
Figure 17:
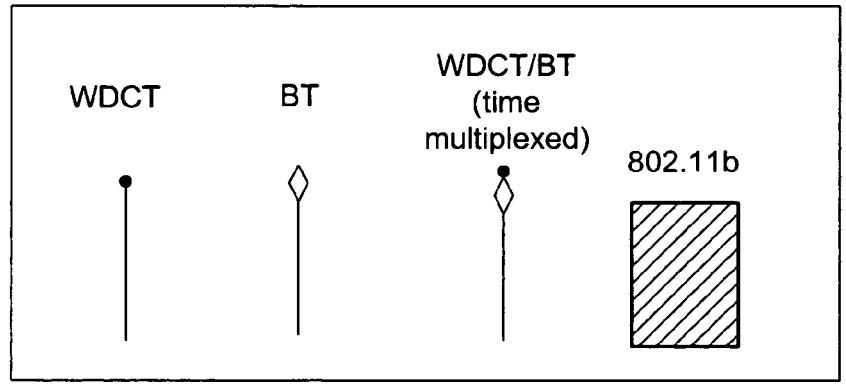

Returning to step 513, if, for example, the BT and WDCT devices are collocated within a common housing, and interference is not tolerable, in step 522 the time multiplexing procedure illustrated in FIG. 12 is adopted to avoid mutual interference of the FHSS devices. In step 524, both BT and WDCT devices employ adaptive frequency hopping to avoid overlap with the 802.11 device. FIG. 17 illustrates the fact that, since they do not operate in the same time domain, the BT and WDCT devices can achieve a greater separation from the 802.11 device. As illustrated in the Figure, the WDCT and BT channels are spaced far from the frequency range occupied by the 802.11 device to avoid any interference with the latter. By allocating less overall frequency range for the FHSS channels to occupy, the WDCT and BT channels cluster within less frequency range than, for example, the embodiment illustrated in FIG. 14a. This may result in the WDCT and BT channels more frequently overlapping in frequency. Nevertheless, even with frequency overlap, mutual interference between the WDCT and BT devices is avoided by the time multiplexing.

Figure 18:
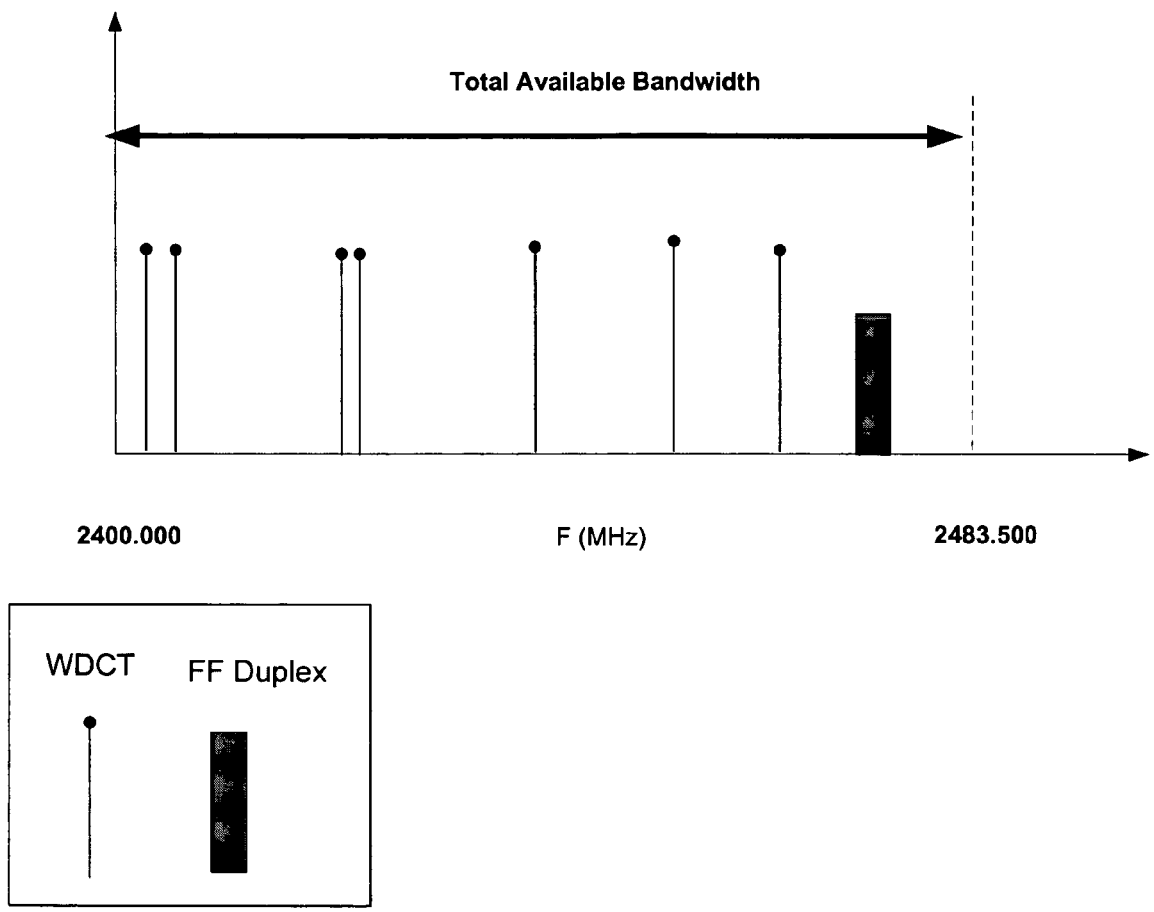
FIG. 18 illustrates the avoidance of overlap between a WDCT device and a FF device according to another exemplary embodiment of the present invention.

In another embodiment of the present invention, a WDCT transceiver detects the presence of a fixed frequency (FF) band interference, such as a duplex communications device. In step 522, using built-in intelligence, the WDCT channels are adjusted to avoid overlap during operation with the FF device, as illustrated in FIG. 18.

Accordingly, the present invention provides a system and method for allowing BT, WDCT, and 802.11 transceivers to operate in close proximity with a minimum of interference. In an exemplary embodiment, a method for avoiding interference between a first FHSS device and other RF devices using 802.11 or FHSS protocols is disclosed. The first FHSS device initially detects the presence of an interfering RF device ("interferer"), according to the invention disclosed in U.S. patent application Ser. No. 10/338,011 which is incorporated by reference herein in its entirety. For example, in one embodiment of the present invention, a method uses known information about an interfering signal-of interest to increase the speed of detection and identification. The method determines a metric by which the interfering signal-of-interest can be identified. For example, one such metric is received signal strength indicator (RSSI). The RSSI is measured at a channel frequency in which the interfering device-of-interest is liked to be found. Using RSSI, the interfering signal-of-interest is deemed present if the metric is satisfied. Because the frequency at which to make the RSSI measurement is chosen where the interfering signal is likely to be found, detection of interference at that frequency also provides identification of the interferer.

For example, where the interfering signal comes from a device operating under 802.11 standard, embodiments of the present invention provide fast detection and identification of 802.11 using known factors of the 802.11 signal, such as channel frequency and bandwidth of the 802.11 signal to measure received signal strength indication (RSSI) on selected channels. In addition, the method makes use of the frequency separation of blocked channels from a known 802.11 channel center frequency, by building a power spectral density function for the interferer, which is the amplitude versus frequency characteristics/shape of the interferer. The above procedure may thus lead to positive identification of an 802.11 presence.

Once the interference signal and frequency are identified, the operation of the first FHSS device is adjusted to avoid overlap with the interferer. In an embodiment of the present invention, the first FHSS device adjusts the hopping frequencies employed for communications to avoid overlapping the frequency band/channel occupied by the 802.11 device whose presence has been detected.

In another embodiment, the first FHSS device detects the presence of a second FHSS device according to the method of detection described above. In an embodiment of the present invention, the operation of the first FHSS device and second FHSS device are adjusted according to the invention disclosed in U.S. patent application Ser. No. 10/429,763 incorporated by reference herein. First, timing information associated with an RF link to the first FHSS device is obtained. Second, using the timing information, the frame start of an RF link to the second FHSS device is aligned to avoid operation of both devices during the same time slots, i.e. interference in time domain is avoided.

In another embodiment, the first FHSS device adjusts the hopping frequencies employed for communication to avoid overlap with the hopping frequencies employed by the second FHSS device. In a preferred embodiment, adjusting of the hopping frequencies is facilitated by software instructions that provide for the first device to acknowledge and correct for signal overlap between the first and second FHSS devices, i.e. replace channels from the hopping sequence which are qualified as bad based upon RSSI or BER criteria.

In another embodiment, a method for avoiding interference between a first FHSS device, a second FHSS device, and an 802.11 device, all operating at the same time, is disclosed. Preferably, the first FHSS device and second FHSS device both initially adjust their respective hopping frequencies to avoid overlapping the frequency band employed by the 802.11 device whose presence has been detected. Eventually, with the use of built-in intelligence to detect the presence of interferers, the hopping frequencies of the first FHSS device will obtain maximum separation in the frequency domain from other potential interferers to minimize the interference.

In a preferred embodiment all the channels employed by the first FHSS device cluster together in a region of the ISM spectrum, while the hopping frequencies of the second FHSS device all cluster in another portion of the spectrum. In the above manner, the interference between the first and second FHSS devices will be minimized, as well as that between the FHSS devices and the 802.11 device.

In another embodiment, a system containing a plurality of RF devices configured for interoperability with a minimum of interference is disclosed. In a preferred embodiment, the system includes at least one FHSS device and at least one 802.11 device. For example, a communications system may contain a Bluetooth transceiver, a WDCT transceiver, and 802.11 transceiver. In one embodiment, the system comprises a base station comprising WDCT, BT and 802.11 devices.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For example, although many of the embodiments disclosed above refer to a WDCT device with built-in intelligence to avoid interference with other RF devices, embodiments in which BT devices operate with similar capabilities are possible, as disclosed, for example, in step 520 of FIG. 5. Similarly, embodiments are envisioned in which built in intelligence in an 802.11 transceiver provides for the 802.11 band to adjust in response to interference detection from FHSS devices.

In addition, embodiments of the present invention are envisioned in which none of the RF devices described above are collocated within a common housing. Nevertheless, using built in intelligence provided in at least one RF device, for example a WDCT cordless device, embodiments of the present invention may operate in accordance with the aforementioned methods, to minimize interference between the WDCT device and external BT and/or 802.11 devices operating in close proximity.

The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for avoiding interference in a radio communications band during operation of a first RF device employing hopping frequencies in a first frequency hopping spread spectrum protocol, in conjunction with the operation of at least one other RF device employing a different communications protocol, comprising:

identifying an interference from the at least one other RF device in the radio communication band; and adjusting the first RF device to avoid overlap with the at least one other RF device, wherein a clustering of the hopping frequencies employed by the first RF device takes place in one or more frequency ranges within the radio communications band, wherein during the clustering of the hopping frequencies employed by the first RF device, a second frequency range within the radio communications band is not occupied by any channel used by the first RF device, the second frequency range being continuous and having a width corresponding to a plurality of channels capable of transmitting communications of the first RF device.

2. The method of claim 1, wherein the identifying the interference comprises determining a bit error rate or frame error rate.

3. The method of claim 1, wherein the at least one other RF device includes a fixed frequency duplex device.

4. The method of claim 1, wherein the at least one other RF device includes a second device, wherein the second device operates according to the IEEE 802.11 protocol.

5. The method of claim 1, wherein the at least one other RF device includes a third device, wherein the third device employs a second frequency hopping spread spectrum protocol.

6. The method of claim 5, wherein the first RF device and the third device operate in the same time domain, wherein the adjusting the first RF device comprises intelligent frequency hopping employed by the first RF device.

7. The method of claim 5, wherein the at least one other RF device further includes a second device, wherein the second device operates in a frequency band according to the IEEE 802.11 protocol.

8. The method of claim 1, wherein the identifying the interference comprises:

selecting a plurality of test channels in accordance with a channel structure of the interferer;

selecting a frequency that is potentially occupied by an interferer that is the source of the interference in each selected channel;

measuring a received signal strength associated with each selected channel; and identifying the interferer in accordance with the measured received signal strength indicators.

9. A method for avoiding interference in a radio communications band during operation of a first RF device employing hopping frequencies in a first frequency hopping spread spectrum protocol, in conjunction with the operation of at least one other RF device employing a different communications protocol, comprising:

identifying an interference from the at least one other RF device in the radio communication band;

adjusting the first RF device to avoid overlap with the at least one other RF device, wherein a clustering of the hopping frequencies employed by the first RF device takes place in one or more frequency ranges, wherein the identifying an interference comprises selecting a plurality of test channels in accordance with a channel structure of the interferer, selecting a frequency that is potentially occupied by an interferer that is the source of the interference in each selected channel, measuring a received signal strength associated with each selected channel, and identifying the interferer in accordance with the measured received signal strength indicators, wherein the at least one other RF device includes a third device, wherein the third device employs a second frequency hopping spread spectrum protocol;

measuring a received signal strength indicator associated with the third device, by the first RF device;

converting the received signal strength indicator into interfering signal transmit timing associated with the third device to estimate transmit timing associated with the third device; and adjusting transmit/receive timing of the first RF device to avoid interference between the first RF device and the third device, whereby the first RF device and the third device do not operate in the same time domain.

10. A method for avoiding interference in a radio communications band during operation of a first RF device employing hopping frequencies in a first frequency hopping spread spectrum protocol, in conjunction with the operation of at least one other RF device employing a different communications protocol, comprising:

identifying an interference from the at least one other RF device in the radio communication band; and adjusting the first RF device to avoid overlap with the at least one other RF device, wherein a clustering of the hopping frequencies employed by the first RF device takes place in one or more frequency ranges, wherein the identifying an interference comprises selecting a plurality of test channels in accordance with a channel structure of the interferer;

selecting a frequency that is potentially occupied by an interferer that is the source of the interference in each selected channel;

measuring a received signal strength associated with each selected channel; and identifying the interferer in accordance with the measured received signal strength indicators, wherein the at least one other RF device includes a third device, wherein the third device employs a second frequency hopping spread spectrum protocol, wherein the at least one other RF device further includes a second device, wherein the second device operates in a frequency band according to the IEEE 802.11 protocol, wherein the first RF device and the third device operate in the same time domain, and wherein the first RF device selects the hopping frequencies that cluster in the one or more frequency ranges, wherein the one or more frequency ranges does not substantially overlap the frequency band employed by the second device.

11. The method of claim 10, wherein the third device includes intelligent frequency hopping capability, whereby the third device selects hop frequencies that cluster in a second frequency range, wherein the second frequency range does not substantially overlap the one or more frequency ranges or the frequency band employed by the second device.

12. A method for avoiding interference in a radio communications band during operation of a first RF device employing hopping frequencies in a first frequency hopping spread spectrum protocol, in conjunction with the operation of at least one other RF device employing a different communications protocol, comprising:

identifying an interference from the at least one other RF device in the radio communication band;

adjusting the first RF device to avoid overlap with the at least one other RF device, wherein a clustering of the hopping frequencies employed by the first RF device takes place in one or more frequency ranges, wherein the identifying an interference comprises selecting a plurality of test channels in accordance with a channel structure of the interferer, selecting a frequency that is potentially occupied by an interferer that is the source of the interference in each selected channel, measuring a received signal strength associated with each selected channel, and identifying the interferer in accordance with the measured received signal strength indicators, wherein the at least one other RF device includes a third device, wherein the third device employs a second frequency hopping spread spectrum protocol, wherein the at least one other RF device further includes a second device, wherein the second device operates in a frequency band according to the IEEE 802.11 protocol;

measuring a received signal strength indicator associated with the third device, by the first RF device;

converting the received signal strength indicator into interfering signal transmit timing associated with the third device to estimate transmit timing associated with the third device; and adjusting transmit/receive timing of the first RF device to avoid interference between the first RF device and the third device, wherein the adjusting the frequency of operation comprises intelligent frequency hopping employed by the first RF device, whereby the first RF device and the third device do not operate in the same time domain, and whereby the first and the third device do not substantially overlap the frequency band employed by the second device.

13. A system comprising:

a first RF module, wherein the first module employs hopping frequencies in a first frequency hopping spread spectrum protocol;

at least one additional RF module;

a first protocol stack and transcoder coupled to the first module; and a system microcontroller in communication with the first module and the at least one additional module, wherein the microcontroller receives and sends instructions through the first module protocol stack and transcoder to adjust operation frequencies employed by the first module to avoid interference identified from the at least one other RF module, wherein a clustering of the hopping frequencies employed by the first RF module takes place in one or more frequency ranges within a radio communications band, wherein during the clustering of the hopping frequencies employed by the first RF module, a second frequency range within the radio communications band is not occupied by any channel used by the first RF module, the second frequency range being continuous and having a width corresponding to a plurality of channels capable of transmitting communications of the first RF module.

14. The system of claim 13, wherein the at least one additional RF module comprises a second module, and wherein the second module employs a second frequency hopping spread spectrum protocol.

15. The system of claim 14, wherein the microcontroller receives and sends instructions through the second module protocol stack and transcoder to adjust operation frequencies employed by the second module to avoid interference with the first RF module.

16. The system of claim 15, wherein the at least one additional RF module further comprises a third module employing an 802.11 protocol, wherein the microcontroller receives and sends instructions through the first module protocol stack and transcoder to adjust the operation frequencies employed by the first module to avoid interference with the frequency band associated with the third RF module.

17. The system of claim 16, wherein the microcontroller receives and sends instructions through the second module protocol stack and transcoder to adjust the operation frequencies employed by the second module to avoid interference with the frequency band associated with the third RF module.

18. The system of claim 17, wherein the microcontroller receives and sends instructions through the first module protocol stack and transcoder to adjust the operation frequencies employed by the first module, wherein the first module selects hop frequencies from one or more frequency ranges that does not substantially overlap the band employed by the third RF module.

19. The system of claim 18, wherein the microcontroller receives and sends instructions through the second module protocol stack and transcoder to adjust the operation frequencies employed by the second module, wherein the second module selects hop frequencies from a second frequency range that does not substantially overlap the one or more frequency ranges or the frequency band employed by the third RF module.

20. The system of claim 13, wherein the at least one additional RF module comprises a third module employing an 802.11 protocol, wherein the microcontroller receives and sends instructions through the first module protocol stack and transcoder to adjust the operation frequencies employed by the first module to avoid interference with the third RF module.

21. The system of claim 13, wherein the interference is identified by:
   selecting a plurality of test channels in accordance with a channel structure of the interferer,
   selecting a frequency that is potentially occupied by an interferer that is the source of the interference in each selected channel,
   measuring a received signal strength associated with each selected channel, and
   identifying the interferer in accordance with the measured received signal strength indicators.

22. An RF communications device comprising:
   a first RF transceiver employing a frequency hopping spread spectrum protocol, wherein the transceiver includes capability of detection of an interferer employing a different RF communications protocol;
   a first frequency hopping spread spectrum protocol stack and transcoder coupled to the first RF transceiver;
   and a microcontroller in communication with the protocol stack, wherein the microcontroller facilitates clustering into one or more frequency ranges of a radio communications band of a set of channels employed by the first transceiver,
   wherein during the clustering, a second frequency range within the radio communications band is not occupied by any channel used by the first RF transceiver, the second frequency range being continuous and having a width corresponding to a plurality of channels capable of transmitting communications of the first RF transceiver,
   wherein the detection of an interferer comprises:
      selecting a plurality of test channels in accordance with a channel structure of the interferer,
      selecting a frequency that is potentially occupied by an interferer that is the source of the interference in each selected channel,
      measuring a received signal strength associated with each selected channel, and
      identifying the interferer in accordance with the measured received signal strength indicators.

23. The device of claim 22, further including:
   a second RF transceiver in communications with the microcontroller, wherein the second RF transceiver employs a communications protocol different from the first transceiver.

* * * * *